United States Patent [19]
Fert

[11] Patent Number: 6,148,029
[45] Date of Patent: Nov. 14, 2000

[54] METHOD OF VARIABLE-LENGTH ENCODING OF IMAGES AND DEVICE FOR PERFORMING SAID

[75] Inventor: Etienne Fert, Paris, France

[73] Assignee: U.S. Philips Corporation, New York, N.Y.

[21] Appl. No.: 09/603,495

[22] Filed: Jun. 10, 1997

Related U.S. Application Data

[63] Continuation of application No. 08/354,565, Dec. 13, 1994, abandoned.

[30]  Foreign Application Priority Data

Dec. 22, 1993 [FR] France ................................. 93 15462

[51] Int. Cl.[7] ...................................................... H04N 7/12
[52] U.S. Cl. ......................................................... 375/240.03
[58] Field of Search ............................. 375/240.03, 243, 375/245; 348/404.1, 406.1, 419.1, 450, 453; 382/251; 341/138, 200

[56] References Cited

U.S. PATENT DOCUMENTS

| | | | |
|---|---|---|---|
| 4,302,775 | 11/1981 | Widergren et al. | 348/406 |
| 4,394,774 | 7/1983 | Widergren et al. | 348/415 |
| 4,868,641 | 9/1989 | Modaresse | 348/419 |
| 5,089,888 | 2/1992 | Zdepski et al. | 348/419 |
| 5,146,324 | 9/1992 | Miller et al. | 348/405 |
| 5,157,488 | 10/1992 | Pennebaker | 348/405 |
| 5,185,655 | 2/1993 | Wakeland | 348/392 |
| 5,189,530 | 2/1993 | Fujii | 358/458 |
| 5,260,808 | 11/1993 | Fujii | 358/458 |
| 5,294,974 | 3/1994 | Naimpally et al. | 348/419 |
| 5,337,049 | 8/1994 | Shimoda | 348/390 |
| 5,337,087 | 8/1994 | Mishima | 348/405 |
| 5,396,567 | 3/1995 | Jass | 382/251 |
| 5,410,351 | 4/1995 | Kojima | 348/419 |
| 5,426,463 | 6/1995 | Reininger et al. | 348/419 |
| 5,434,623 | 7/1995 | Coleman et al. | 348/405 |
| 5,452,007 | 9/1995 | Enari et al. | 348/405 |
| 5,500,677 | 3/1996 | Fert | 348/402 |
| 5,696,558 | 12/1997 | Tsukamoto | 348/405 |
| 5,745,179 | 4/1998 | Senda | 348/405 |

FOREIGN PATENT DOCUMENTS

| | | | |
|---|---|---|---|
| 0510921 | 10/1992 | European Pat. Off. | H04N 7/30 |
| 0535960 | 4/1993 | European Pat. Off. | H04N 7/30 |

OTHER PUBLICATIONS

"ISO–IEC/JC1/SC29/WG11; Test Model 4.2", Feb. 1993, p. 73.

Primary Examiner—Vu Le

[57] ABSTRACT

A method for variable-length encoding of images includes a quantization step followed by a variable-length encoding step, whereafter the signals obtained are stored in a buffer memory. The quantization step used is computed on the basis of a feedback parameter, which is a decreasing function of the filling level of the buffer memory, and a feedforward parameter, which is a function of the quantity of information in the image. Advantageously, the feedforward parameter includes at least a multiplicative factor which is a decreasing function of the saturation of one of the chrominance components U or V in the current block or macroblock with respect to the rest of the image. An encoding device is also described.

21 Claims, 2 Drawing Sheets

| Item | Description |
|---|---|
| 71 | Input Terminal |
| 70 | Prediction Module |
| 15 | Discrete Cosine Transform (DCT) Module |
| 20 | Quantizer |
| 30 | Variable Length Coder |
| 40 | Buffer Memory |
| 41 | Output Terminal |
| 50 | Inverse Quantizer |
| 60 | Inverse DCT Module |
| 80 | Bitrate Control Module |
| 90a | Weighting Module |
| 91 | Chrominance Component V Factor Estimator |
| 92 | Chrominance Component U Factor Estimator |
| 93 | Multiplier |
| 94 | Luminance Component Factor Estimator |

| Item | Description |
|---|---|
| 71 | Input Terminal |
| 70 | Prediction Module |
| 15 | Discrete Cosine Transform (DCT) Module |
| 20 | Quantizer |
| 30 | Variable Length Coder |
| 40 | Buffer Memory |
| 41 | Output Terminal |
| 50 | Inverse Quantizer |
| 60 | Inverse DCT Module |
| 80 | Bitrate Control Module |
| 90a | Weighting Module |
| 94 | Luminance Component Factor Estimator |

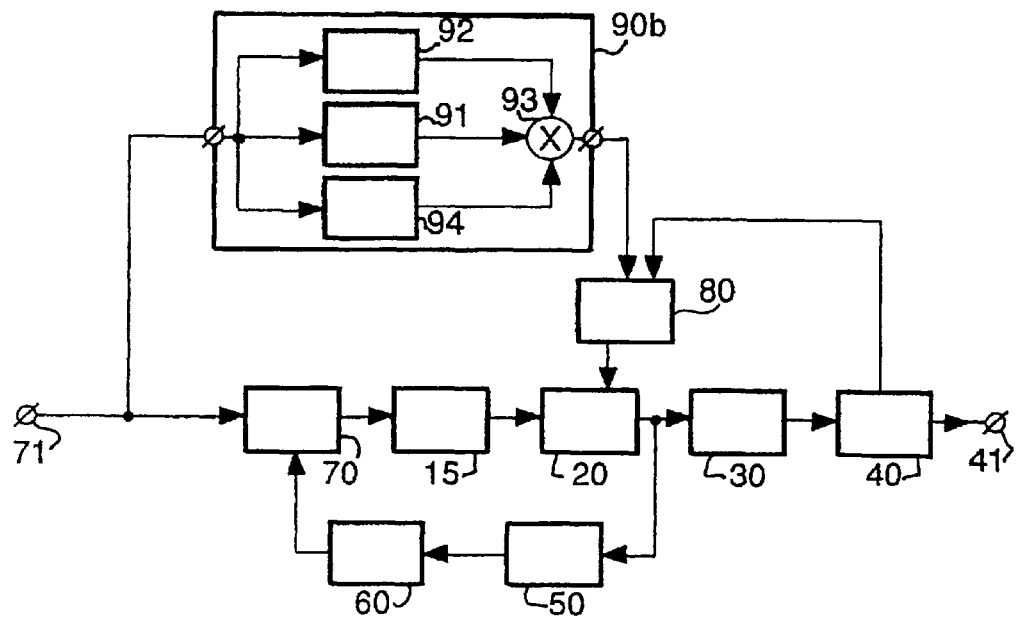

FIG. 2

| Item | Description |
|---|---|
| 71 | Input Terminal |
| 70 | Prediction Module |
| 15 | Discrete Cosine Transform (DCT) Module |
| 20 | Quantizer |
| 30 | Variable Length Coder |
| 40 | Buffer Memory |
| 41 | Output Terminal |
| 50 | Inverse Quantizer |
| 60 | Inverse DCT Module |
| 80 | Bitrate Control Module |
| 90a | Weighting Module |
| 91 | Chrominance Component V Factor Estimator |
| 92 | Chrominance Component U Factor Estimator |
| 93 | Multiplier |
| 94 | Luminance Component Factor Estimator |

METHOD OF VARIABLE-LENGTH ENCODING OF IMAGES AND DEVICE FOR PERFORMING SAID

This is a continuation of application Ser. No. 08/354,565, filed Dec. 13, 1994 now abandoned.

BACKGROUND OF THE INVENTION

The invention relates to a method of encoding images represented by digital signals organized in luminance and chrominance blocks which may themselves be regrouped in macroblocks, particularly comprising:

a first step of quantizing said signals, a second step of variable-length encoding the signals thus quantized, whereafter the encoded signals are stored in a buffer memory, the quantization step used during the first step being computed on the basis of a feedback parameter which is a decreasing function of the filling level of the buffer memory, and a multiplicative correction factor in the form of a feedforward parameter which is a function of the quantity of information in the image.

Such a method is in conformity with the project for the MPEG2 standard (Moving Pictures Expert group) of ISO and is particularly used in the field of transmitting and storing images.

The document published by ISO under the reference "ISO-IEC/JCT1/SC29/WG11; Test Model 4.2" in February 1993 describes a process of bitrate control of the buffer memory output. It consists of dividing, within the image, the variations of the number of binary elements allocated for encoding each block or macroblock as a function of the quantity of information in each block or macroblock with respect to the average number. The more a block or macroblock contains information components, the fewer encoding faults are apparent. The quantization step may be augmented without entailing a very considerable loss of quality. When, in contrast, a block or macroblock contains very little information, it will be necessary to use a fine quantization so as to prevent this information from getting lost.

The MPEG encoding structure will be briefly described hereinafter. A digital image may be represented by an assembly of three matrices comprising groups of eight bits: one luminance matrix and two chrominance matrices. These matrices are divided into blocks of 8×8 pixels so that four adjacent blocks of a luminance matrix correspond to one block for each chrominance matrix. The six blocks thus obtained form a macroblock. The macroblock is the basic unit which is used for estimating and compensating motion, and for choosing the quantization step. A macroblock header thus comprises the value of the quantization step used for the quantizer. Several macroblocks are subsequently regrouped in a slice, while several slices form an image, and several images are regrouped in a group of pictures or GOP and several GOPs form a sequence. A sequence header particularly comprises a quantization matrix, of 8×8 size, used for quantizing each block of the sequence when this matrix is new with respect to that used in the preceding sequence and when it does not belong to the assembly of matrices predefined by the standard, in which case it is sufficient to indicate which one is used.

An encoding device with which the method as described in the above document can be carried out is shown in FIG. 1. It comprises in series a DCT (Discrete Cosine Transform) module 15, a module 20 for quantizing the DCT coefficients thus obtained, a module 30 for variable-length encoding of the coefficients thus quantized and a buffer memory 40, a first output of which is connected to the output 41 of the device. In the embodiment described, the device also comprises a prediction branch connected to the output of the quantization module 20 and comprising an inverse quantization module 50 and an inverse DCT module 60 whose output is connected to a first input of a prediction module 70 which is connected to the input of the DCT module 15. A second input of this prediction module 70 is connected to the input 71 of the device. Moreover, a second output of the buffer memory 40 is connected to a bitrate control module 80 to which it supplies a feedback parameter related to the filling level of the buffer memory. On the other hand, the input 71 of the device is connected to the input of a weighting module 90a whose output is connected to the bitrate control module 80 to which it supplies a feedforward parameter. The output of the bitrate control module 80 is connected to the quantization module 20.

With the prediction branch it is possible not to encode the temporal redundance in the images: for each incoming macroblock the prediction module 70 evaluates a prediction macroblock on the basis of blocks of images which have previously been transmitted and which are supplied to the input of the prediction module 70 after passage through the inverse quantization module 50 and the inverse DCT module 60. Subsequently, it compares them so as to determine whether it is more interesting to encode either the original macroblock or the difference between the original macroblock and the predicted macroblock. The DCT module 15 treats the blocks of 8×8 pixels. As soon as the DCT coefficients are obtained, they are quantized by the quantization module 20 as a function of a quantization step provided by the bitrate control module 80. The quantization operates as follows:

$$C_{dctQi} = C_{dcti}/(W_i \times Q2)$$

where $C_{dcti}$, $C_{dctQi}$, $W_i$, and Q2 are the 1st transform coefficient with a quantized value, the 1st coefficient of the quantization matrix W used for the current sequence, and the quantization step used. Thus, the higher the value of the quantization step Q2, the coarser the quantization and the less precise the coefficients obtained during decoding.

With the transform coefficients obtained being quantized, they are subsequently encoded by the variable-length encoding module 30 and applied to the buffer memory 40. To control the bitrate of this buffer memory 40, the bitrate control module 80 varies, for each macroblock, the quantization step Q2 whose value is transmitted to the decoder in the header of the macroblock. This variation is realised as a function of two parameters.

The feedback parameter, which is related to the filling level of the buffer memory 40, provides the possibility of computing a first value Q1 of the quantization step which is larger as the filling level of the buffer memory is higher. A mode for computing Q1 is described in the above-mentioned project for the standard.

The feedforward parameter, denoted P, which is supplied by the weighting module 90a, enables the bitrate control module 80 to modify this first value Q1 so as to take the contents of the image into account. The quantization step Q2 thus obtained is equal to:

$$Q2 = Q1 \times P$$

In this known device, the weighting module 90a is constituted by a module 94 for estimating the quantity of information in the macroblock to be encoded with respect to the average number computed in an image. The feedforward parameter provided by this weighting module 90a is thus equal to a factor $F_Y$, referred to as the luminance factor, which is smaller as this quantity of information is also smaller. It is expressed in the following manner:

$$P = F_y = \frac{(n_Y \times a_Y) + c_Y}{a_Y + (n_Y \times c_Y)}$$

where $a_Y$, $c_Y$ and $n_Y$ are the quantity of information in the macroblock, the average quantity of information in a macroblock computed in the preceding image, and a fixed parameter for adjusting the variation limits of the quantization step (Q1/$n_Y$<Q2<($n_y$×Q1). The value of $n_Y$ is preferably chosen to be about 2 with which a range of variations which is large enough is obtained while maintaining a satisfactory image quality. The quantity $a_y$ of information components in a macroblock is given by the minimum value of the variance computed in each block of a field D, preferably constituted by the current block or macroblock and by the directly contiguous blocks. The variance of a luminance block B is defined by the following expression:

$$Var(B) = \sum_{i,j} \left( x_{i,j} - \left( \frac{\sum_{i,j} x_{i,j}}{N} \right) \right)^2$$

in which Var indicates the variance, N represents the number of pixels in the luminance block B, and $x_{i,j}$ denotes their luminance.

Thus, the quantity $a_Y$ of information components in a block or macroblock is equal to:

$$a_Y = 1 + \text{Min}_{B_k \in D}[\text{Var}(B_k)]$$

where $B_k$ represents the blocks of the field D.

However, great encoding experience has been gained in different test sequences and it appears that the human eye is particularly sensitive to encoding faults in zones where the image or one of the chrominance components U or V is largely saturated.

It is an object of the present invention to take this characteristic of the human eye into account.

SUMMARY OF THE INVENTION

According to the invention, an encoding method as described in the opening paragraph is characterized in that said feedforward parameter comprises at least a multiplicative factor referred to as chrominance factor for the current block or macroblock, which is a decreasing function of the saturation of one of the chrominance components U or V in the current block or macroblock with respect to the rest of the image.

Thus it is possible to take the saturation level of one of the chrominance components U or V into account so as to divide the number of binary elements allocated to the different blocks or macroblocks of the image. The more this component is saturated, the more it has to use a fine quantization step to avoid the appearance of faults during reconstruction of the image.

In another embodiment, said feedforward parameter is constituted by two multiplicative factors referred to as chrominance factor U and chrominance factor V, respectively, for the current block or macroblock, which are a decreasing function of the saturation of the chrominance component U and the chrominance component V, respectively, in the current block or macroblock with respect to the rest of the image.

It is thus possible to refine the feedforward parameter used by taking the saturation level of the two chrominance components U and V into account.

Advantageously, each chrominance factor for a block or macroblock is obtained from an expression of the type:

$$\frac{(n \times a) + c}{a + (n \times c)}$$

in which:

a is a complexity variable which is a decreasing function of the saturation of the corresponding chrominance component in the current block or macroblock, c is an average value of the complexity a in an image, n represents a parameter for adjusting the variation limits of said chrominance factor.

The use of an average value of the chrominance component in the block or macroblock provides the possibility of determining the level of the chrominance components V and/or U of this block or macroblock in order to attribute a complexity thereto which is smaller as this level is higher.

Moreover, in a particularly interesting embodiment, the complexity a is given for each chrominance factor by an expression of the type $$a = (g+1) - |g-m|$$

in which:

m represents the average value of the corresponding chrominance component in the current block or macroblock, g represents the value of this chrominance component corresponding to a grey pixel.

Thus, a complexity which is proximate to the maximum (g+1) will be attributed to a block which is predominantly grey and will thus be quantized more coarsely than a block for which the chrominance component V is largely saturated (proximate to 0 or 2. g), to which block a complexity proximate to the minimum (1) will be attributed.

The invention also relates to a device for encoding images, with which device a method according to the invention can be carried out. Such a device particularly comprises:

a module for quantizing the digital signals corresponding to images, a module for variable-length encoding of the signals thus quantized, a buffer memory, and, arranged between the buffer memory and the quantization module, a module for bitrate control of the buffer memory output, comprising means for modifying the quantization step with the aid of a feedback parameter which is a decreasing function of the filling level of the buffer memory and with the aid of a multiplicative correction factor in the form of a feedforward parameter which is a function of the quantity of information in the image and is provided by a weighting module.

According to the invention, such an encoding device is characterized in that said weighting module comprises at least a module for estimating a multiplicative factor referred to as chrominance factor for the current block or macroblock, which is a decreasing function of the saturation of one of the chrominance components U or V in the current block or macroblock with respect to the rest of the image.

In an advantageous embodiment of an encoding device according to the invention, said weighting module comprises, in parallel, two modules for estimating two multiplicative factors referred to as chrominance factor U and chrominance factor V, respectively, for the current block or macroblock, which are a decreasing function of the saturation of the chrominance component U and the chrominance component V, respectively, in the current block or macroblock with respect to the rest of the image, and a module for multiplying said factors, whose output supplies said feedforward parameter.

In another advantageous embodiment, in which the weighting module comprises a module for estimating a luminance factor which represents the quantity of information in a luminance block or macroblock with respect to an average value of this quantity computed in an image, said weighting module comprises a module for multiplying said luminance and chrominance factors, the output of said multiplier module supplying said feedforward parameter.

The notion of the quantity of information in the block or macroblock, as already known in the prior art, is taken into account in the feedforward parameter according to the invention, which yields particularly good results.

These and other aspects of the invention will be apparent from and elucidated with reference to the embodiments described hereinafter.

BRIEF DESCRIPTION OF THE DRAWINGS

FIG. 2 is a diagram representing a device with which a variable-length encoding method according to the invention can be carried out.

DETAILED DESCRIPTION OF THE PREFERRED EMBODIMENTS OF THE INVENTION

Figure 1:
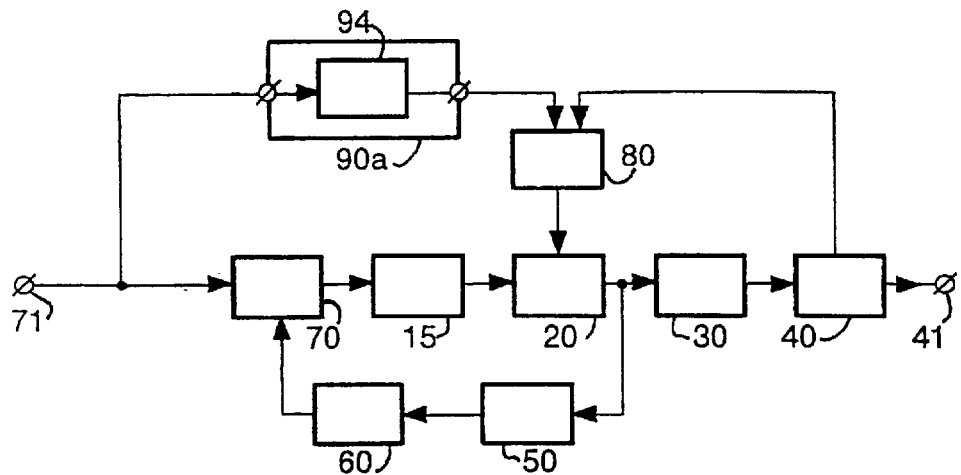
FIG. 1 is a diagram representing a device with which a variable-length encoding method as described in the prior art can be carried out.

FIG. 2 describes a preferred embodiment of the device according to the invention. The reference numerals denoting elements which are common with those in FIG. 1 are identical.

In FIG. 2, an encoding device according to the invention comprises elements 15 to 80 which are substantially identical to those shown in FIG. 1. Moreover, the input 71 of the device according to the invention is connected to the input of a weighting module 90b whose output is connected to the bitrate control module 80 to which it supplies a feedforward parameter. The input of the weighting module 90b is connected to:
a module 91 for estimating a factor $F_V$ for the chrominance component V,
a module 92 for estimating a factor $F_U$ for the chrominance component U,
and a module 94 for estimating a luminance factor $F_Y$, identical to that described with reference to FIG. 1.
The outputs of these three estimation modules are connected to a multiplier module 93. The output of this multiplier module constitutes the output of the weighting module 90b.

In this embodiment, the feedforward parameter, with which the first value Q1 of the quantization step can be modified, is a product of three multiplicative factors $F_V$, $F_U$ and $F_Y$ supplied by the estimation modules 91, 92 and 94, respectively. The quantization step Q2 thus obtained is equal to:

$$Q2 = Q1 \times F_V \times F_U \times F_Y$$

The factor $F_V$ for the chrominance component V is defined by the following expression:

$$F_V = \frac{(n_V \times a_V) + c_V}{a_V + (n_V \times c_V)}$$

in which:
$a_V$ is a complexity variable which is equal to: $a_V = (g+1) - |g - m_V|$ in which $m_V$ represents the average value of the chrominance component V in the current block or macroblock and g represents the value of this chrominance component corresponding to a grey pixel;
$c_V$ is an average value of the complexity $a_V$ in the preferred previous image,
$n_V$ represents a parameter for adjusting the variation limits of this chrominance factor V.

In practice, the grey level corresponds to a digital level g of the component which is equal to 128 and the chrominance component V is more saturated as its digital value is close to 0 or 256. When the chrominance component V in the current block or macroblock is largely saturated (i.e. close to 0 or 256) the complexity $a_V$ is low (i.e. close to 1). When, in contrast, this component is close to the grey level, it is higher (i.e. close to the maximum value of 129). The complexity attributed to a block or macroblock is thus smaller as the chrominance component V is, on average, close to saturation. The feedforward parameter is then smaller and the quantization is finer: the zones of the image in which the chrominance component V is largely saturated are more finely encoded.

In a particularly advantageous embodiment, the parameter $n_V$ for adjusting the variation limits of the factor $F_V$ for the chrominance component V is chosen to be equal to 8 so as to give it a sufficient weight in the feedforward parameter.

The factor $F_U$ for the chrominance component U is provided by the block 92 in a similar manner and provides the possibility of taking into account the level of the chrominance component U in the block or macroblock to be encoded.

Thus, $$F_U = \frac{(n_U \times a_U) + c_U}{a_U + (n_U \times c_U)}$$

in which
the complexity $a_U$ is given by an expression of the type $a_U = (g+1) - |g - m_U|$, $m_U$ representing the average value of the chrominance component U in the current block or macroblock and g representing the value of this chrominance component corresponding to a grey pixel,
$c_U$ is an average value of the complexity $a_U$ in an image,
$n_U$ represents a parameter for adjusting the variation limits of this chrominance factor U which is also advantageously equal to 8.

It will be evident that modifications may be introduced in the embodiments described hereinbefore, notably by substitution of equivalent technical means without departing from the scope of the invention.

It is particularly possible to use other mathematical models for the chrominance and luminance factors, the complexity and the quantity of information in a block or macroblock. The parameters for adjusting the variation limits of these different factors may alternatively have different values.

In another embodiment it is possible to take only the saturation level of one of the two chrominance components V or U into account in the feedforward parameter, or only the saturation level of the two chrominance components, or again one of the two chrominance components V or U and the quantity of information in each block or macroblock.

Since the human eye is particularly sensitive to encoding faults in the zones where the chrominance component V is largely saturated, the use of the chrominance component V in the computation of the feedforward parameter will enhance the results to a more considerable extent than the use of the component U.

Although the method described comprises a DCT step, the invention can be used independently of the fact whether the method comprises or does not comprise a preceding transform step, and is also independent of the type of this transform, if any.

What is claimed is:

1. A method of encoding images represented by digital signals organized in luminance and chrominance blocks grouped into macroblocks, comprising the steps of:

quantizing the digital signals to produce quantized signals;

variable-length encoding said quantized signals to produce encoded signals; and storing said encoded signals in a buffer memory, wherein a quantization step used in performing the quantizing step is computed on the basis of a feedback parameter which is a decreasing function of the filling level of the buffer memory, and a multiplicative correction factor in the form of a feedforward parameter which is a function of the quantity of information in the image currently being encoded, and wherein said feedforward parameter comprises at least one chrominance factor for a current block or macroblock, which is a decreasing function of the saturation of one of chrominance components U and V in the current block or macroblock, with respect to the rest of the image.

2. The method of encoding images as claimed in claim 1, wherein said at least one chrominance factor comprises a chrominance factor U' and a chrominance factor V', respectively, for the current block or macroblock, which are decreasing functions of the saturation of the chrominance component U and the chrominance component V in the current block or macroblock with respect to the rest of the image currently being encoded.

3. The method of encoding images as claimed in claim 2, wherein each of said chrominance factors U' and V' for a block or macroblock is derived from an expression:

$$\frac{(n \times a) + c}{a + (n \times c)}$$

where:

a is a complexity variable which is a decreasing function of the saturation of the corresponding chrominance component U or V in the current block or macroblock;

c is an average value of the complexity a of the image currently being encoded; and n represents a parameter for adjusting variation limits of said chrominance factor U' or V'.

4. The method of encoding images as claimed in claim 1, wherein said chrominance factor for a block or macroblock is derived from an expression:

$$\frac{(n \times a) + c}{a + (n \times c)}$$

where:

a is a complexity variable which is a decreasing function of the saturation of the corresponding chrominance component U or V in the current block or macroblock;

c is an average value of the complexity of the image currently being encoded; and n represents a parameter for adjusting the variation limits of said chrominance factor.

5. The method of encoding images as claimed in claim 4, wherein the complexity a for said chrominance factor is defined by an expression:

$$a = (g+1) - (g-m)$$

where:

m represents the average value of the corresponding chrominance component U or V in the current block or macroblock; and g represents the value of the chrominance component U or V corresponding to a grey pixel.

6. The method of encoding images as claimed in claim 5, wherein the average complexity value c is computed for the image preceding the image currently being encoded.

7. The method of encoding images as claimed in claim 4, wherein the average complexity value c is computed for the image preceding the image currently being encoded.

8. A device for encoding images represented by digital signals organized in luminance and chrominance blocks grouped into macroblocks, comprising:

a first module for quantizing the digital signals to produced quantized signals;

a second module for variable-length encoding said quantized signal to produce encoded signals;

a buffer memory receiving and storing said encoded signals; and a third module disposed between said buffer memory and said first module for bitrate control of an output of said buffer memory, said third module including means for modifying a quantization step utilized by said first module responsive to both a feedback parameter, which is a decreasing function of a filling level of said buffer memory, and a multiplicative correction factor in the form of a feedforward parameter, which is a function of the quantity of information in the image currently being encoded and which is provided by a weighting module;

wherein said weighting module comprises at least one module for estimating at least one chrominance factor for the current block or macroblock, which is a decreasing function of the saturation of one of the chrominance components U and V in the current block or macroblock with respect to the rest of the image currently being encoded.

9. The device for encoding images as claimed in claim 8, wherein:

said at least one chrominance factor comprises a chrominance factor U' and a chrominance factor V' for the current block or macroblock, which are decreasing functions of the saturation of the chrominance component U and the chrominance component V, respectively, in the current block or macroblock with respect to the rest of the image currently being encoded: and said weighting module comprises:

first and second parallel modules for estimating said chrominance factor U' and said chrominance factor V', respectively; and a module for multiplying the estimated chrominance factors U' and V' to produce said feedforward parameter.

10. The device for encoding images as claimed in claim 9, wherein said first and second parallel modules for estimating said chrominance factors U' and V', respectively, each comprises means for computing an expression:

$$\frac{(n \times a) + c}{a + (n \times c)}$$

where:

a is a complexity variable which is a decreasing function of the saturation of the corresponding chrominance component U or V in the current block or macroblock;

c is an average value of the complexity of the image currently being encoded; and n represents a parameter for adjusting variation limits of said chrominance factor U' or V'.

11. The device for encoding images as claimed in claim 8, wherein said at least one module for estimating said chrominance factor comprises means for computing an expression:

$$\frac{(n \times a) + c}{a + (n \times c)}$$

where:

a is a complexity variable which is a decreasing function of the saturation of the corresponding chrominance component U or V in the current block or macroblock;

c is an average value of the complexity for the image currently being encoded; and n represents a parameter for adjusting variation limits of said chrominance factor U' or V'.

12. The device for encoding images as claimed in claim 11, wherein the complexity a for said chrominance factor is defined by an expression:

$$a=(g+1)-(g-m)$$

where:

m represents the average value of the corresponding chrominance component U or V in the current block or macroblock; and g represents the value of the associated chrominance component U or V for a grey pixel.

13. The device for encoding images as claimed in claim 11, wherein the average complexity value c is computed for the image preceding the image currently being encoded.

14. The device for encoding images as claimed in claim 13, wherein said weighting module comprises:

a module for estimating a luminance factor which represents the quantity of information in a luminance block or macroblock with respect to an average value of this quantity computed of the image currently being encoded; and a module for multiplying said luminance and chrominance factors to produce said feedforward parameter.

15. The device for encoding images as claimed in claim 11, wherein said weighting module comprises:

a module for estimating a luminance factor which represents the quantity of information in a luminance block or macroblock with respect to an average value of this quantity computed in the image currently being encoded: and a module for multiplying said luminance factor and said chrominance factor U' or V' to produce said feedforward parameter.

16. The device for encoding images as claimed in claim 11, wherein said weighting module comprises:

a module for estimating a luminance factor which represents the quantity of information in a luminance block or macroblock with respect to an average value of this quantity computed of the image currently being encoded; and a module for multiplying said luminance and chrominance factors to produce said feedforward parameter.

17. The device for encoding images as claimed in claim 8, wherein said weighting module comprises:

a module for estimating a luminance factor which represents the quantity of information in a luminance block or macroblock with respect to an average value of this quantity computed in the image currently being encoded; and a module for multiplying the estimated luminance factor and said at least one chrominance factor to produce said feedforward parameter.

18. A device for modifying a quantization step used in system for encoding images represented by digital signals organized in luminance and chrominance blocks grouped into macroblocks, the system having a first module for quantizing the signals, a second module for variable-length encoding the quantized signals, and a buffer memory receiving the output of said second module, the device comprising:

a weighting module including at least one module for estimating a chrominance factor for the current block or macroblock, which is a decreasing function of the saturation of one of the chrominance components U and V in the current block or macroblock with respect to the rest of the image currently being encoded; and a control module disposed between the buffer memory and the first module for bitrate control of the output of the buffer memory, said control module including means for modifying a quantization step utilized by the first module responsive to both a feedback parameter, which is a decreasing function of a filling level of the buffer memory, and a feedforward parameter, which is a function of the quantity of information in the image currently being encoded.

19. The device as claimed in claim 18, wherein:

said at least one chrominance factor comprises a chrominance factor U' and a chrominance factor V' for the current block or macroblock, which are decreasing functions of the saturation of the chrominance component U and the chrominance component V, respectively, in the current block or macroblock with respect to the rest of the image currently being encoded: and said weighting module comprises:

first and second parallel modules for estimating said chrominance factor U' and said chrominance factor V', respectively; and a module for multiplying the estimated chrominance factors U' and V' to produce said feedforward parameter.

20. The device for encoding images as claimed in claim 19, wherein each of said first and second parallel modules for estimating the chrominance factors U' and V', respectively, each comprises means for computing an expression:

$$\frac{(n \times a) + c}{a + (n \times c)}$$

where a is a complexity variable which is a decreasing function of the saturation of the corresponding chrominance component U or V in the current block or macroblock;

c is an average value of the complexity of the image currently being encoded; and n represents a parameter for adjusting variation limits of said chrominance factor U' or V'.

21. The device for encoding images as claimed in claim 20, wherein the complexity a for each of said chrominance factors U' and V' is defined by an expression $$a = (g+1) - (g-m)$$

where:

m represents the average value of the corresponding chrominance component U or V in the current block or macroblock; and g represents the value of the corresponding chrominance component U or V of a grey pixel.

* * * * *